(12) United States Patent
Hada

(10) Patent No.: US 12,281,690 B2
(45) Date of Patent: Apr. 22, 2025

(54) EXTENSION/CONTRACTION MECHANISM

(71) Applicant: TOYOTA JIDOSHA KABUSHIKI KAISHA, Aichi-ken (JP)

(72) Inventor: Yoshitaka Hada, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/502,080

(22) Filed: Nov. 6, 2023

(65) Prior Publication Data

US 2024/0191787 A1    Jun. 13, 2024

(30) Foreign Application Priority Data

Dec. 9, 2022   (JP) .................................. 2022-197097

(51) Int. Cl.
F16H 25/20    (2006.01)
F16B 7/10    (2006.01)

(52) U.S. Cl.
CPC ............... *F16H 25/20* (2013.01); *F16B 7/10* (2013.01); *F16H 2025/2096* (2013.01)

(58) Field of Classification Search
CPC ..... F16H 25/20; F16H 2025/2096; F16B 7/10
USPC ........................................................ 74/89.23
See application file for complete search history.

(56) References Cited

U.S. PATENT DOCUMENTS

| | | | |
|---|---|---|---|
| 2,946,556 A * | 7/1960 | Edgerton, Jr. .......... | F16G 13/20 254/1 |
| 5,249,396 A * | 10/1993 | Zuse ..................... | E04H 12/185 52/118 |
| 5,336,032 A * | 8/1994 | Pipes .................. | B65G 47/5154 414/800 |
| 6,547,216 B1 * | 4/2003 | Bouchard ............. | B66F 13/005 254/89 R |
| 10,050,342 B1 * | 8/2018 | Hall ......................... | H01Q 3/06 |
| 12,038,069 B2 * | 7/2024 | Erickson ................. | B66F 11/00 |
| 2011/0126650 A1 * | 6/2011 | Sorensen ............ | F16H 19/0636 29/401.1 |
| 2021/0341041 A1 | 11/2021 | Iwamoto et al. | |

FOREIGN PATENT DOCUMENTS

JP    2021-173391 A    11/2021

* cited by examiner

*Primary Examiner* — T. Scott Fix
(74) *Attorney, Agent, or Firm* — HAUPTMAN HAM, LLP

(57) ABSTRACT

To provide an extension/contraction mechanism that can lessen increase stress imposed on belts. An extension/contraction mechanism according to the present disclosure includes a telescopic extension/contraction part, in which the extension/contraction mechanism includes a first drive source connected to a screw shaft in such a way that it can transmit a drive force, a first belt holder that accommodates a second belt in such a way that the second belt can be sent out to the screw shaft or the second belt can be wound-up from the screw shaft, a second belt holder that accommodates a first belt in such a way that the first belt can be wound-up from the screw shaft, and a first belt holder drive part and a second belt holder drive part. The first and second belt holder drive parts rotate the first and second belt holders independently of the rotation of the screw shaft, respectively.

3 Claims, 15 Drawing Sheets

EXTENSION/CONTRACTION MECHANISM

CROSS REFERENCE TO RELATED APPLICATIONS

This application is based upon and claims the benefit of priority from Japanese patent application No. 2022-197097, filed on Dec. 9, 2022, the disclosure of which is incorporated herein in its entirety by reference.

BACKGROUND

The present disclosure relates to an extension/contraction mechanism.

Japanese Unexamined Patent Application Publication No. 2021-173391 discloses an extension/contraction mechanism including a telescopic extension/contraction part. In this extension/contraction mechanism, with the rotation of a screw shaft, the extension/contraction part is extended while the first belt and the second belt are drawn out from the second belt holder and the first belt holder, respectively, and are spirally wound. In addition, with the rotation of the screw shaft, the extension/contraction part is contracted while the state in which the first belt and the second belt are engaged with each other and wound is loosened.

SUMMARY

The inventors of the present application found the following technical problem.

In an extension/contraction mechanism like the one described above, a belt holder follows the rotation of a screw shaft. In some cases, the belt feed rate, which a feed rate of the belt from the belt holder to the screw shaft, and the belt wound-up rate, which is a wound-up rate of the belt wound up by the screw shaft, gradually become mismatched, causing increase in the tensile force or the bending stress imposed on the first belt.

The present disclosure has been made in view of the aforementioned problem and provides an extension/contraction mechanism that can lessen increase in stress imposed on the belts.

An extension/contraction mechanism according to the present disclosure is an extension/contraction mechanism including a telescopic extension/contraction part, in which
the extension/contraction mechanism includes:
a first drive source connected to a screw shaft in such a way that it can transmit a drive force;
a first belt holder that accommodates a second belt in such a way that the second belt can be sent out to the screw shaft or the second belt can be wound-up from the screw shaft;
a second belt holder that accommodates a first belt in such a way that the first belt can be sent out to the screw shaft or the first belt can be wound-up from the screw shaft; and
a first belt holder drive part and a second belt holder drive part, and
in which
the extension/contraction part is extended when the screw shaft rotates in one direction and sends out the first belt and the second belt so that the first belt and the second belt are spirally wound in a state in which they are engaged with each other, and is contracted when the screw shaft rotates in the other direction and draws in the first belt and the second belt so that the state in which the first belt and the second belt are engaged with each other and wound is loosened,
the first belt holder drive part rotates the first belt holder independently of the rotation of the screw shaft, and
the second belt holder drive part rotates the second belt holder independently of the rotation of the screw shaft.

In the aforementioned extension/contraction mechanism, the first belt holder drive part may rotate the first belt holder at a rotational speed lower than a rotational speed of the screw shaft, and
the second belt holder drive part may rotate the second belt holder at a rotational speed lower than the rotational speed of the screw shaft.

In the aforementioned extension/contraction mechanism, as the extension/contraction part is extended, a ratio of the rotational speed of the first belt holder to the rotational speed of the screw shaft and a ratio of the rotational speed of the second belt holder to the rotational speed of the screw shaft may decrease.

According to the present disclosure, it is possible to lessen increase in stress imposed on the belts.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarity of the description, the following descriptions and the drawings are simplified as appropriate.

First Embodiment

Figure 1:
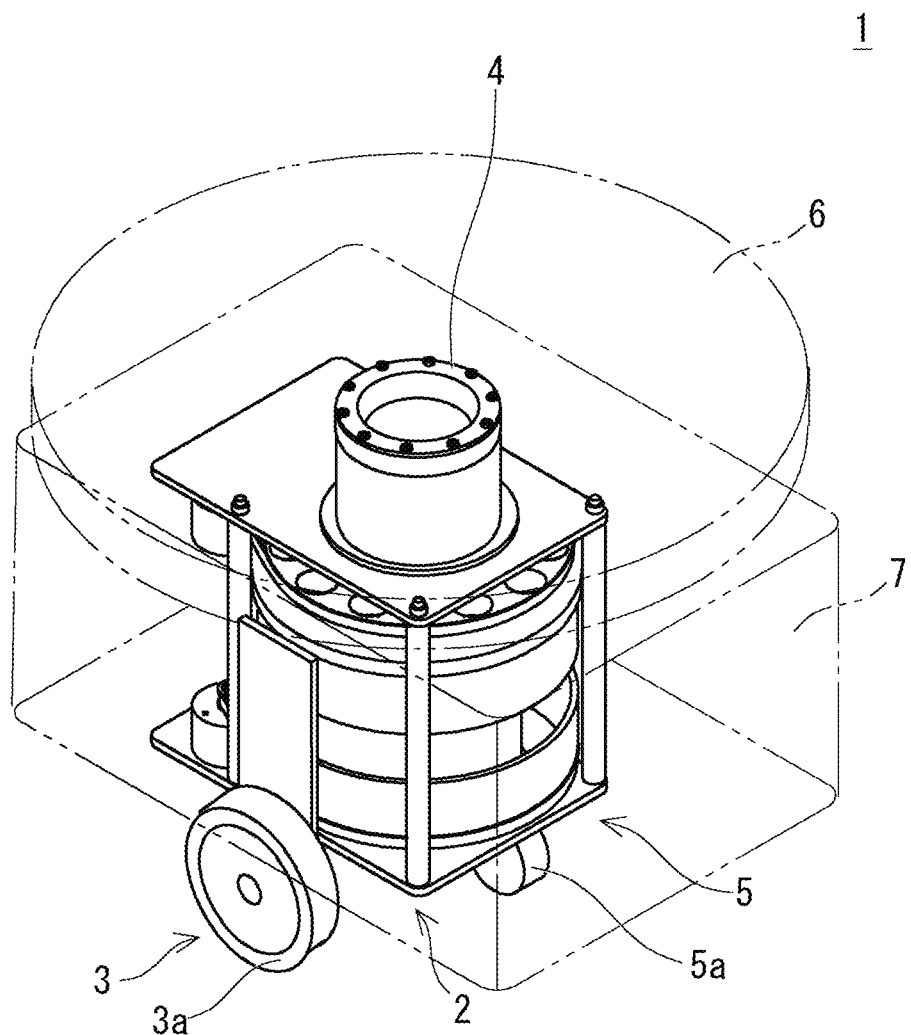
FIG. 1 is a perspective view schematically showing a mobile body according to a first embodiment.
Figure 2:
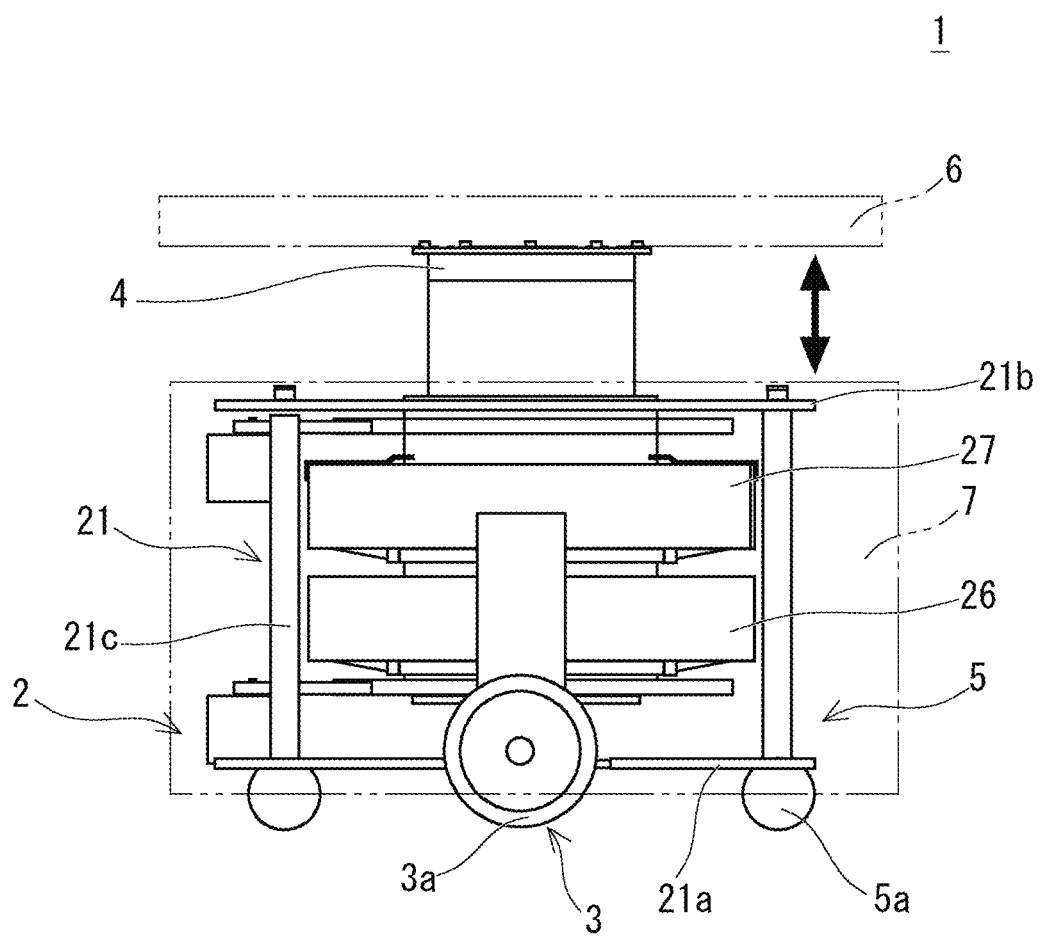
FIG. 2 is a side view schematically showing the mobile body according to the first embodiment.

First, a basic structure of a mobile body in which an extension/contraction mechanism according to this embodiment is employed will be described. FIG. 1 is a perspective view schematically showing the mobile body according to this embodiment. FIG. 2 is a side view schematically showing the mobile body according to this embodiment.

As shown in FIGS. 1 and 2, a mobile body 1 according to this embodiment includes an extension/contraction mechanism 2 and a drive part 3. The extension/contraction mechanism 2 includes an extension/contraction part 4 and a base part 5. The extension/contraction part 4 is a telescopic cylindrical body that can be extended/contracted, and a plate 6 is provided, for example, in an upper end part of the extension/contraction part 4, although the details of the extension/contraction part 4 will be described later.

The base part 5 supports the extension/contraction part 4 so that the extension/contraction part 4 can be extended/contracted, although the details of the base part 5 will be described later. Free casters 5*a* are provided, for example, in the front end part and the rear end part on the lower surface of the base part 5. The base part 5 may be, for example, covered with a cover 7. FIGS. 1 and 2 each indicate the plate 6 and the cover 7 by alternate long and two short dashes lines so that the structure of the mobile body 1 becomes clear.

The drive part 3 includes right and left drive wheels 3*a*, a motor (not shown) and the like. The right and left drive wheels 3*a*, the motor and the like are supported by the base part 5. This mobile body 1 travels forward, backward, or turns by rotationally driving, for example, the right and left drive wheels 3*a* separately from each other. Then the extension/contraction part 4 is extended or contracted in the vertical direction, whereby the plate 6 is displaced in the vertical direction. The mobile body 1 may be operated either by autonomous control or by an external instruction.

Figure 3:
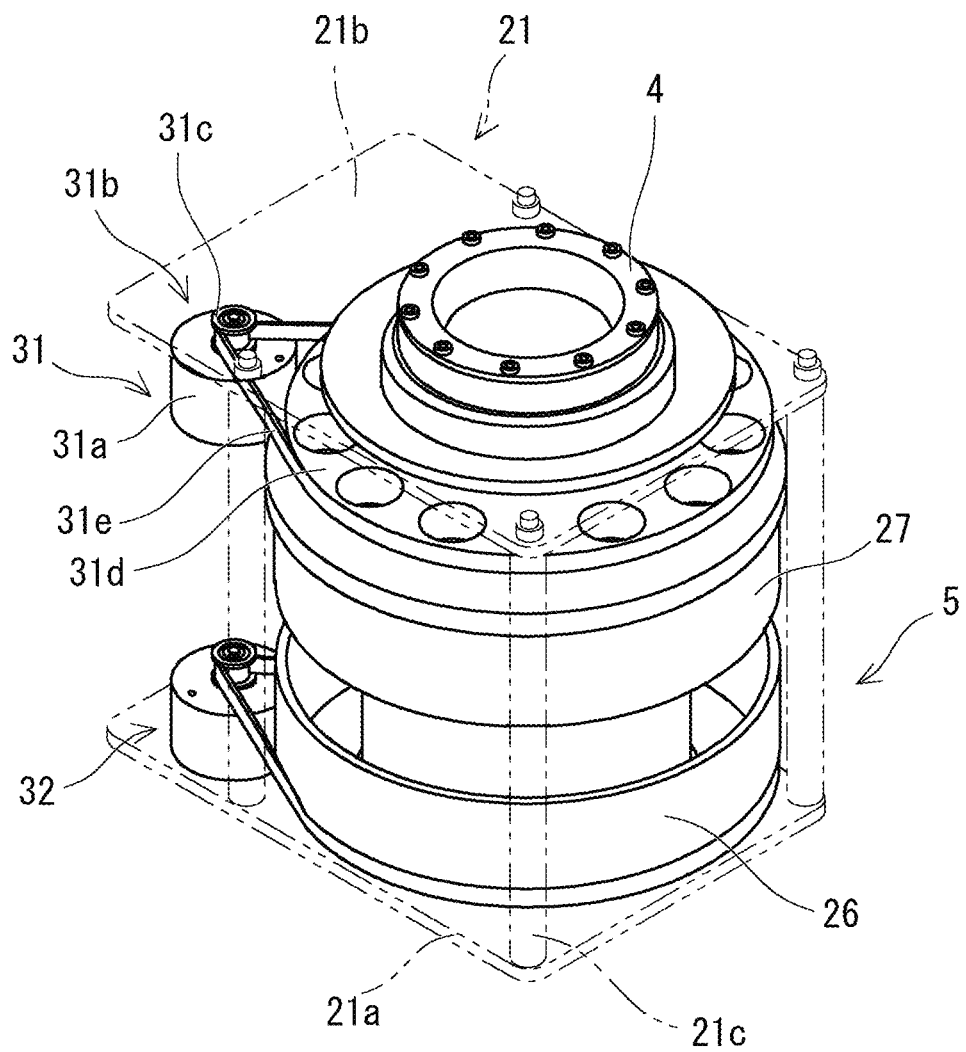
FIG. 3 is a perspective view showing an extension/contraction mechanism according to the first embodiment.
Figure 4:
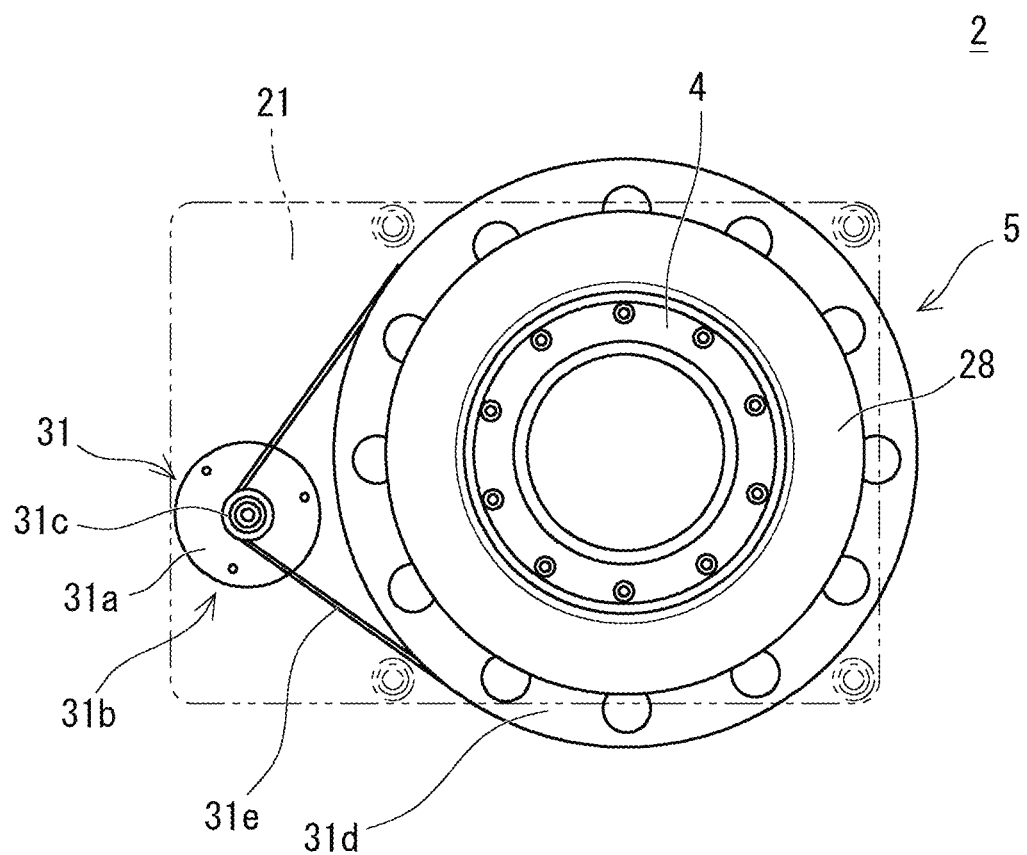
FIG. 4 is a plan view showing the extension/contraction mechanism according to the first embodiment.
Figure 5:
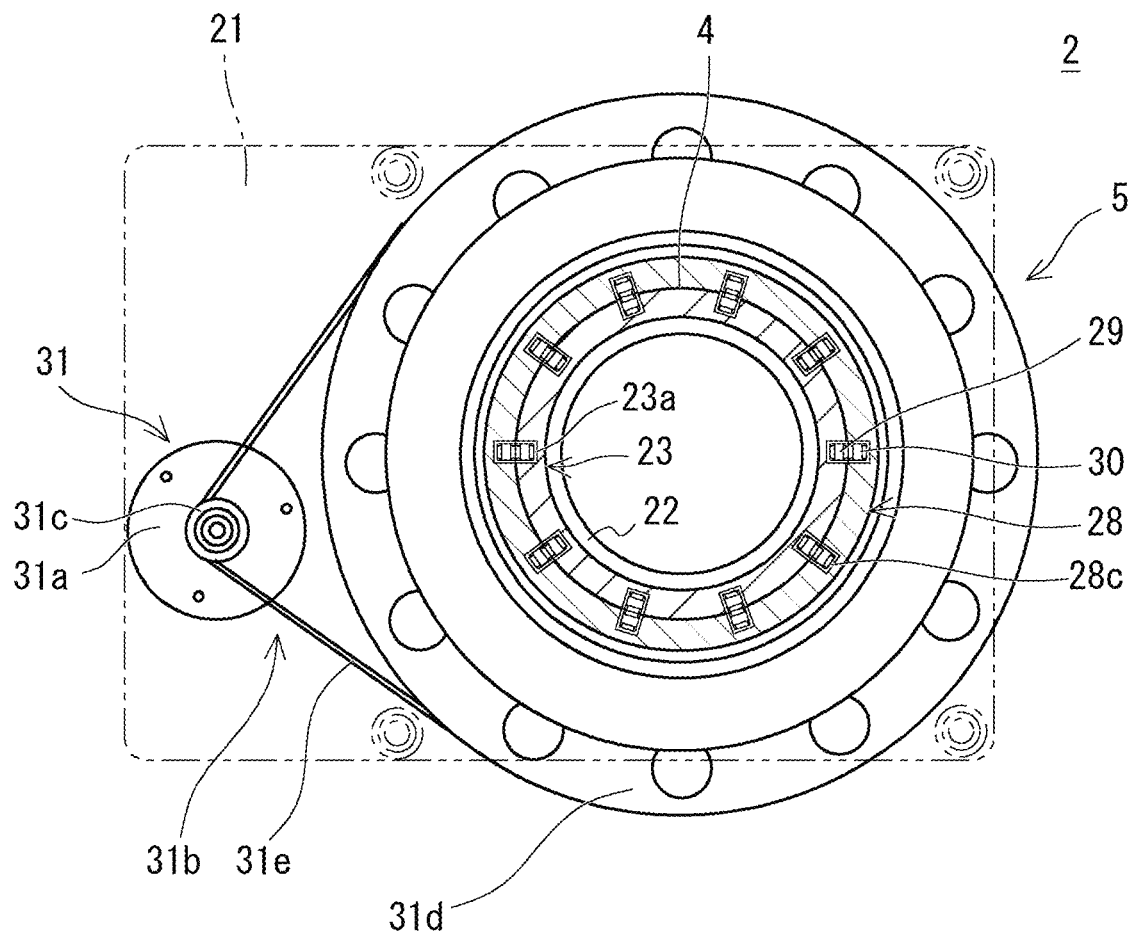
FIG. 5 is a horizontal cross-sectional view showing the extension/contraction mechanism according to the first embodiment.
Figure 6:
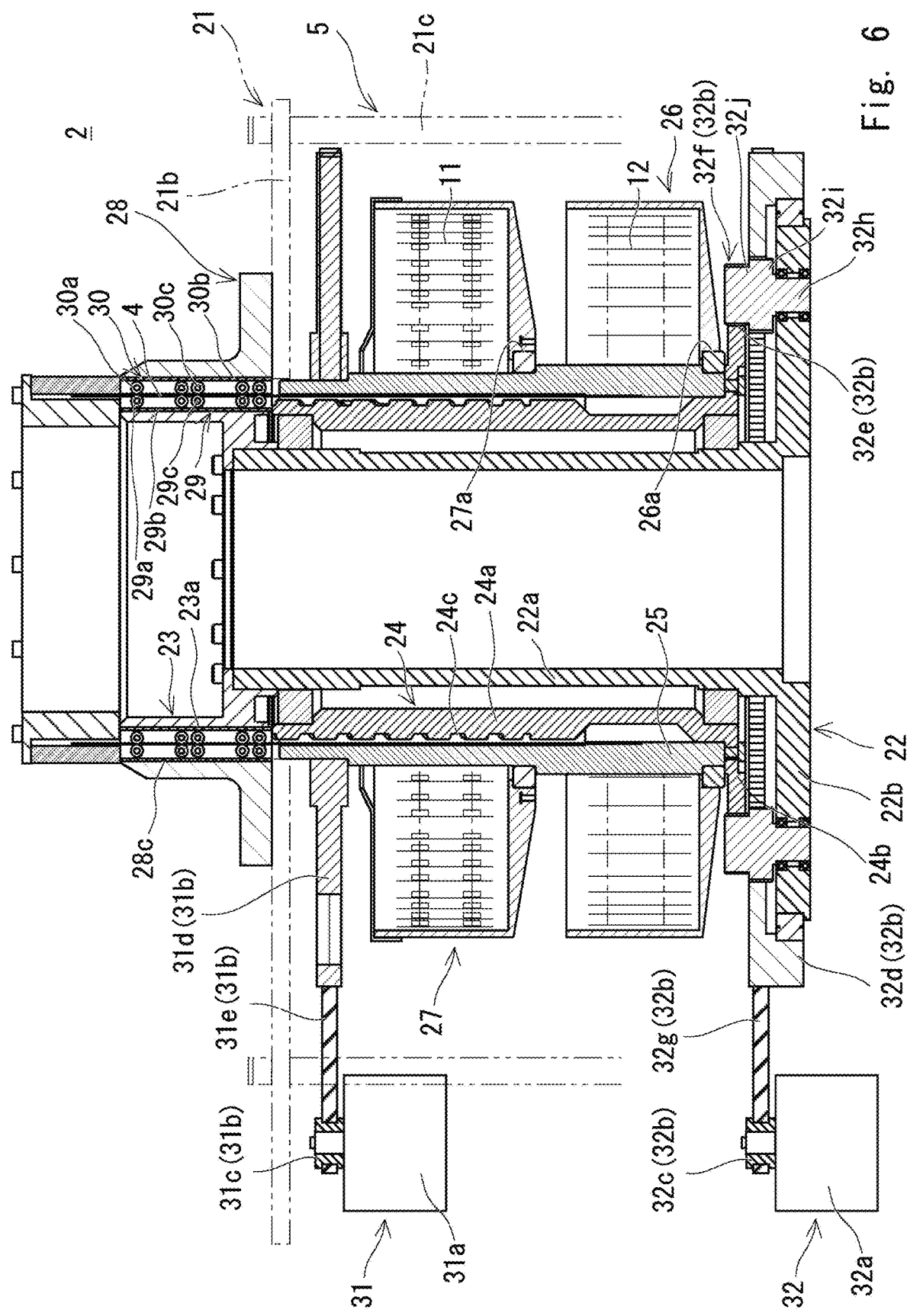
FIG. 6 is a vertical cross-sectional view showing the extension/contraction mechanism according to the first embodiment.
Figure 7:
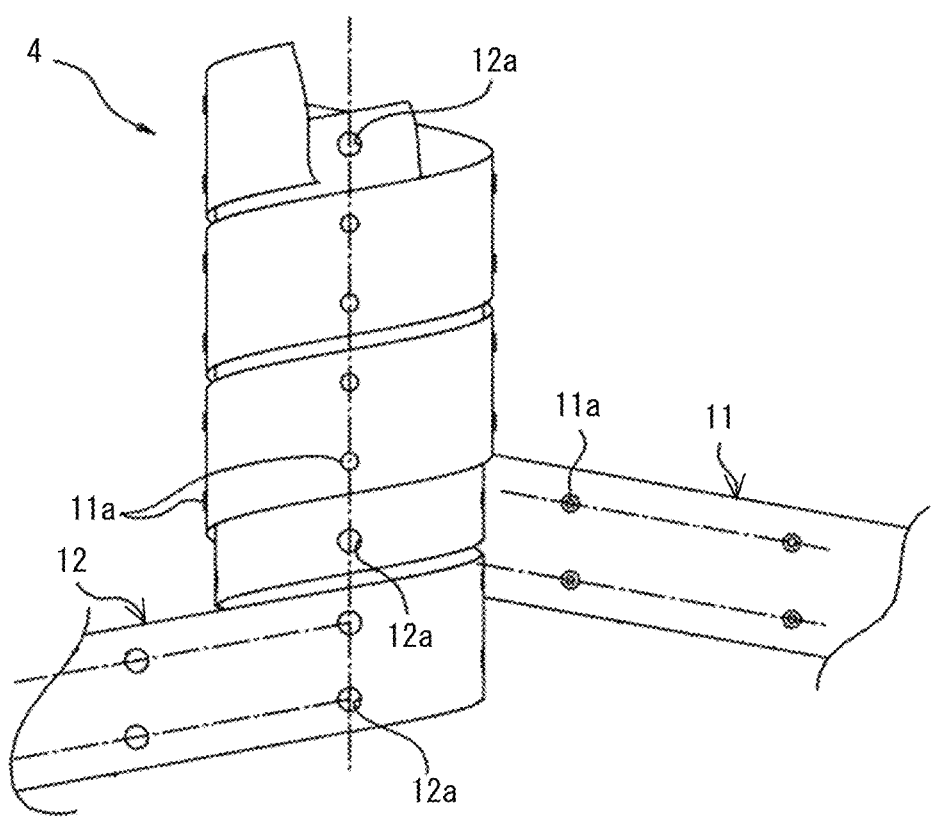
FIG. 7 is a diagram for describing an extension/contraction part according to the first embodiment.
Figure 8:
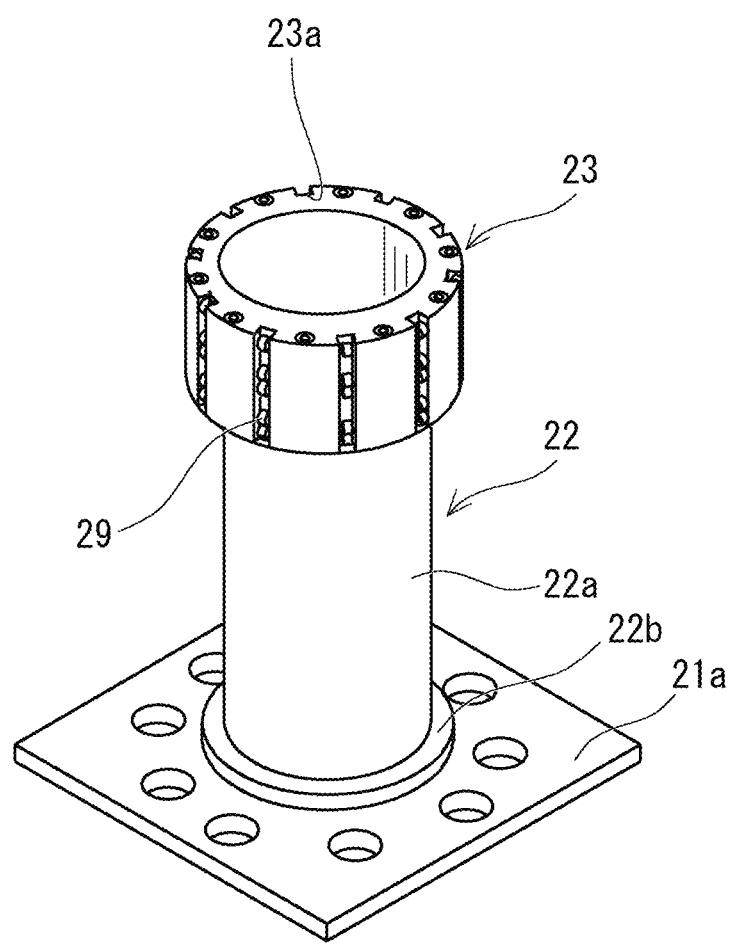
FIG. 8 is a perspective view showing a main shaft and the like of the extension/contraction mechanism according to the first embodiment.
Figure 9:
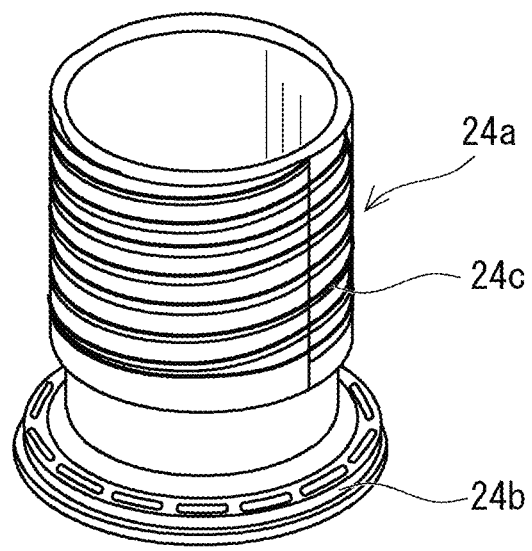
FIG. 9 is a perspective view showing a screw shaft of the extension/contraction mechanism according to the first embodiment.
Figure 10:
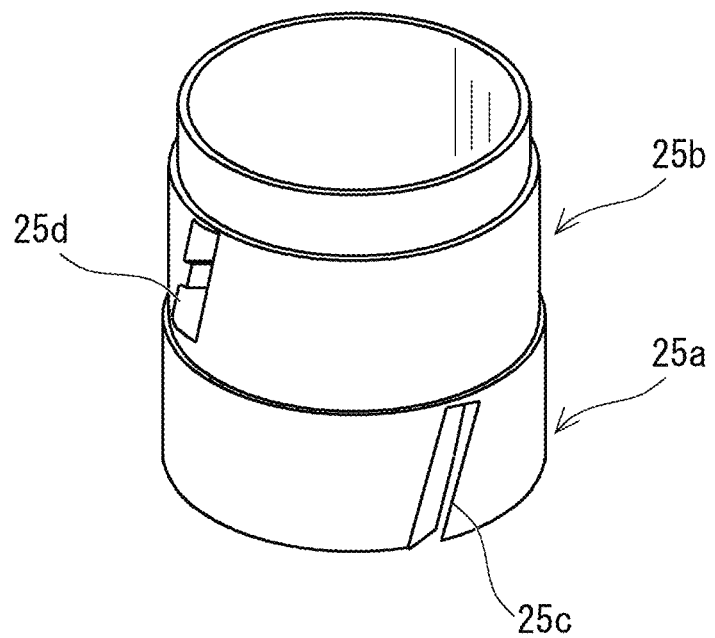
FIG. 10 is a perspective view showing a belt guide of the extension/contraction mechanism according to the first embodiment.
Figure 11:
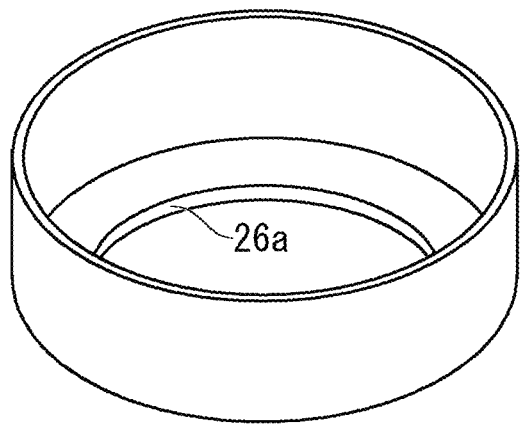
FIG. 11 is a perspective view showing a first belt holder of the extension/contraction mechanism according to the first embodiment.
Figure 12:
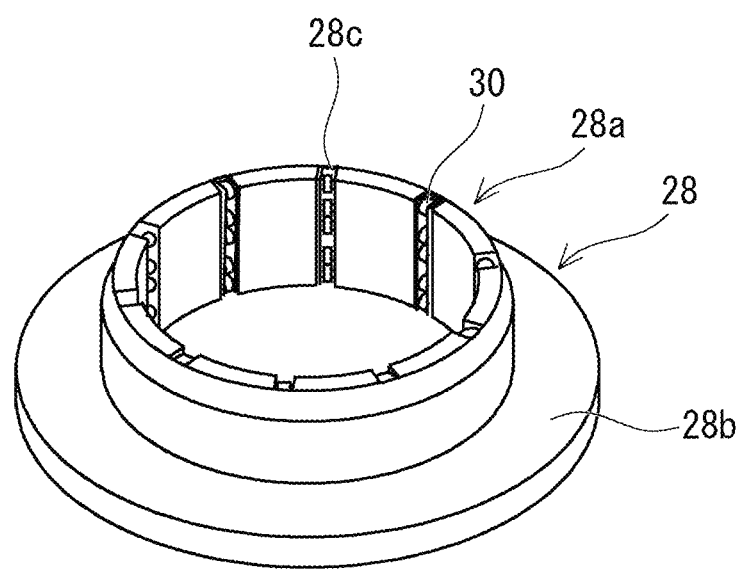
FIG. 12 is a perspective view showing a first roller holding part of the extension/contraction mechanism according to the first embodiment.
Figure 13:
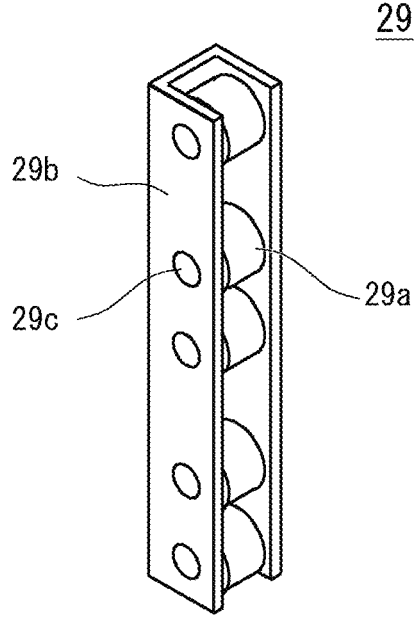
FIG. 13 is a perspective view showing a roller unit of the extension/contraction mechanism according to the first embodiment.

Next, a structure of the extension/contraction mechanism 2 according to this embodiment will be described in detail. FIG. 3 is a perspective view showing the extension/contraction mechanism according to this embodiment. FIG. 4 is a plan view showing the extension/contraction mechanism according to this embodiment. FIG. 5 is a horizontal cross-sectional view showing the extension/contraction mechanism according to this embodiment. FIG. 6 is a vertical cross-sectional view showing the extension/contraction mechanism according to this embodiment. FIG. 7 is a diagram for describing the extension/contraction part according to this embodiment. FIG. 8 is a perspective view showing a main shaft and the like of the extension/contraction mechanism according to this embodiment. FIG. 9 is a perspective view showing a screw shaft of the extension/contraction mechanism according to this embodiment. FIG. 10 is a perspective view showing a belt guide of the extension/contraction mechanism according to this embodiment. FIG. 11 is a perspective view showing a first belt holder of the extension/contraction mechanism according to this embodiment. FIG. 12 is a perspective view showing a first roller holding part of the extension/contraction mechanism according to this embodiment. FIG. 13 is a perspective view showing a roller unit of the extension/contraction mechanism according to this embodiment.

As described above, the extension/contraction mechanism 2 according to this embodiment includes the extension/contraction part 4 and the base part 5, as shown in FIGS. 3 to 6. As shown in FIG. 7, the extension/contraction part 4 includes a first belt 11 and a second belt 12. The first belt 11, which is, for example, a strip-shaped body made of steel, is provided with engagement pins 11*a* at substantially equal intervals along opposing long sides of the first belt 11. The second belt 12, which is, for example, a strip-shaped body made of steel having a thickness that is equal to that of the first belt 11, is provided with engagement holes 12*a* in such a way that the engagement holes 12*a* correspond to the pitches of the engagement pins 11*a* along the opposing long sides of the second belt 12.

The second belt 12 is arranged inside the first belt 11 in advance, and the first belt 11 and the second belt 12 are wound in a spiral shape in such a way that they are offset from each other, thereby forming the extension/contraction part 4. At this time, the engagement pins 11*a* of the first belt 11 are protruded toward the inside of the extension/contraction part 4, the engagement pins 11*a* on the upper side of the first belt 11 are engaged with the engagement holes 12*a* on the lower side of the second belt 12 arranged to be shifted upward with respect to the first belt 11 and the engagement pins 11*a* on the lower side of the first belt 11 are engaged with the engagement holes 12*a* on the upper side of the second belt 12 arranged to be shifted downward with respect to the first belt 11.

As shown in FIGS. 3 to 6, the base part 5 includes a frame 21, a main shaft 22, a first roller holding part 23, a screw shaft 24, a belt guide 25, a first belt holder 26, a second belt holder 27, a second roller holding part 28, a first roller unit 29, a second roller unit 30, a first drive part 31, and a second drive part 32. FIGS. 3 to 6 each show the frame 21 by an alternate long and two short dashes line so that the structure of the extension/contraction mechanism 2 becomes clear.

As shown in FIG. 3, the frame 21 includes a first plate 21*a*, a second plate 21*b*, and struts 21*c*. The first plate 21*a* is a plate-shaped body having a substantially flat upper surface. The second plate 21*b*, which is a plate-shaped body having a substantially flat upper surface, is arranged above the first plate 21*a*. A through-hole is formed in the second plate 21*b*. The struts 21*c*, which are provided in edge parts of the first plate 21*a*, couple the first plate 21*a* with the second plate 21*b*.

As shown in FIG. 8, the main shaft 22 includes a cylindrical part 22*a* and a flange part 22*b* that is protruded outward from the lower end part of the cylindrical part 22*a* and the lower end part of the main shaft 22 is rotatably supported by the first plate 21a. As shown in FIG. 6, the upper end part of the cylindrical part 22a in this main shaft 22 is protruded upward from the second plate 21b in a state in which it is made to pass through the through-hole of the second plate 21b in the frame 21.

As shown in FIG. 8, the first roller holding part 23 is a cylindrical body, and groove parts 23a that are extended in the vertical direction are formed on the outer peripheral surface of the first roller holding part 23. The groove parts 23a are arranged, for example, at substantially equal intervals in the circumferential direction of the first roller holding part 23. This first roller holding part 23 is fixed to the upper end part of the cylindrical part 22a in the main shaft 22.

As shown in FIG. 9, the screw shaft 24 includes a cylindrical part 24a and a flange part 24b. Groove parts 24c having a spiral shape into which the engagement pins 11a of the first belt 11 are inserted are formed on the outer peripheral surface of the cylindrical part 24a. The flange part 24b is protruded outward from the lower end part of the cylindrical part 24a.

Then, as shown in FIG. 6, the cylindrical part 22a of the main shaft 22 is made to pass through the screw shaft 24, and the screw shaft 24 is arranged between the flange part 22b of the main shaft 22 and the first roller holding part 23 in a state in which the screw shaft 24 can be rotated with respect to the main shaft 22.

As shown in FIG. 10, the belt guide 25, which has a cylindrical body as its basic form, includes a first part 25a having a first outer diameter and a second part 25b that has a second outer diameter that is smaller than the first outer diameter and is arranged above the first part 25a.

An opening 25c through which the second belt 12 passes is formed in the first part 25a of the belt guide 25. An opening 25d through which the first belt 11 passes is formed in the second part 25b of the belt guide 25.

Then, as shown in FIG. 6, the cylindrical part 24a of the screw shaft 24 is passed inside the belt guide 25 and the lower end part of the belt guide 25 is fixed to the flange part 24b of the screw shaft 24.

Accordingly, the screw shaft 24 and the belt guide 25 can be rotated about the main shaft 22. At this time, a gap through which the first belt 11 overlapping the second belt 12 can pass is formed between the outer peripheral surface of the cylindrical part 24a of the screw shaft 24 and the inner peripheral surface of the belt guide 25.

The first belt holder 26 accommodates the second belt 12 which is in a state before it forms the extension/contraction part 4. As shown in FIG. 11, the first belt holder 26 has a bottomed cylindrical body as its basic form, and a through-hole 26a is formed in the bottom part of the first belt holder 26.

Then, as shown in FIG. 6, the belt guide 25 is made to pass through the through-hole 26a of the first belt holder 26 and the first belt holder 26 is supported by the flange part 24b of the screw shaft 24 in a state in which the first belt holder 26 can be rotated with respect to the belt guide 25.

The second belt holder 27 accommodates the first belt 11 which is in a state before it forms the extension/contraction part 4. The second belt holder 27 has a shape substantially equal to that of the first belt holder 26 and a through-hole 27a is formed in the bottom part of the second belt holder 27.

As shown in FIG. 6, the second belt holder 27 is arranged above the first belt holder 26. Then the belt guide 25 is made to pass through the through-hole 27a of the second belt holder 27 and the second belt holder 27 is supported by a step part between the first part 25a and the second part 25b in the belt guide 25 in a state in which the second belt holder 27 can be rotated with respect to the belt guide 25.

As shown in FIG. 12, the second roller holding part 28 includes a cylindrical part 28a and a flange part 28b. The cylindrical part 28a has an inner diameter that is larger than the outer diameter of the first roller holding part 23 and groove parts 28c that are extended in the vertical direction are formed on the inner peripheral surface of the cylindrical part 28a. The groove parts 28c are arranged, for example, at substantially equal intervals in the circumferential direction of the cylindrical part 28a. The flange part 28b is formed in such a way that it is protruded outward from the lower end part of the cylindrical part 28a.

Then, as shown in FIG. 6, the flange part 28b of the second roller holding part 28 is fixed to the second plate 21b of the frame 21 in a state in which the first roller holding part 23 is made to pass inside the second roller holding part 28. At this time, as shown in FIG. 5, the groove parts 23a of the first roller holding part 23 and the groove parts 28c of the second roller holding part 28 may be arranged so that they are substantially opposed to each other.

As shown in FIG. 13, the first roller unit 29 includes rollers 29a and a fixing tool 29b. The rollers 29a, which can be rotated about a rotation shaft 29c that is extended in the substantially horizontal direction, are aligned in the vertical direction.

The fixing tool 29b, which is formed in a substantially C-shape when it is seen from the vertical direction, supports the rollers 29a via the rotation shaft 29c in a state in which the rollers 29a are arranged inside the fixing tool 29b. This first roller unit 29 is fitted into the groove parts 23a of the first roller holding part 23 and is fixed therein.

While the detailed description of the second roller unit 30 is omitted since the structure thereof is the same as that of the first roller unit 29, the rollers 30a aligned in the vertical direction are fixed to the fixing tool 30b via the rotation shaft 30c in such a way that the rollers 30a can be rotated. As shown in FIG. 12, the second roller unit 30 is fitted into the groove parts 28c of the second roller holding part 28 and is fixed therein.

At this time, a gap through which the first belt 11 and the second belt 12 can pass in a state in which they overlap each other is formed between the rollers 29a of the first roller unit 29 and the rollers 30a of the second roller unit 30, and when this gap is seen from the vertical direction, it is seen that it substantially overlaps the gap between the outer peripheral surface of the cylindrical part 24a of the screw shaft 24 and the inner peripheral surface of the belt guide 25.

The rollers 29a of the first roller unit 29 and the rollers 30a of the second roller unit 30 are arranged in such a way that, when the first belt 11 and the second belt 12 pass through the gap between the rollers 29a of the first roller unit 29 and the rollers 30a of the second roller unit 30 in a state in which the first belt 11 and the second belt 12 overlap each other, the rollers 29a of the first roller unit 29 come in contact with the inner peripheral surface of the second belt 12 and the rollers 30a of the second roller unit 30 come in contact with the outer peripheral surface of the first belt 11.

As shown in FIG. 6, the first drive part 31 includes a motor (a first drive source) 31a and a drive transmission part 31b. The motor 31a is supported by the second plate 21b of the frame 21, although the motor 31a is not specifically shown in FIG. 6. The drive transmission part 31b includes a pinion gear 31c, a pulley 31d, and a belt 31e.

The pinion gear 31c is fixed to the output shaft of the motor 31a. The pulley 31d is a ring gear having a tooth part formed on the outer peripheral surface thereof, and the inner peripheral part of the pulley 31d is fixed to the upper end part of the belt guide 25 in such a way that it can transmit a drive force. The belt 31e, which is an endless belt in which a tooth part is formed on the inner peripheral surface thereof, bridges the pinion gear 31c and the pulley 31d.

As shown in FIG. 6, the second drive part 32 includes a motor (a second drive source) 32a and a drive transmission part 32b. The motor 32a is supported by the first plate 21a of the frame 21 although the motor 32a is not specifically shown in FIG. 6. The drive transmission part 32b includes a pinion gear 32c, a ring gear 32d, an external tooth part 32e, a planet gear 32f, and a belt 32g.

Figure 14:
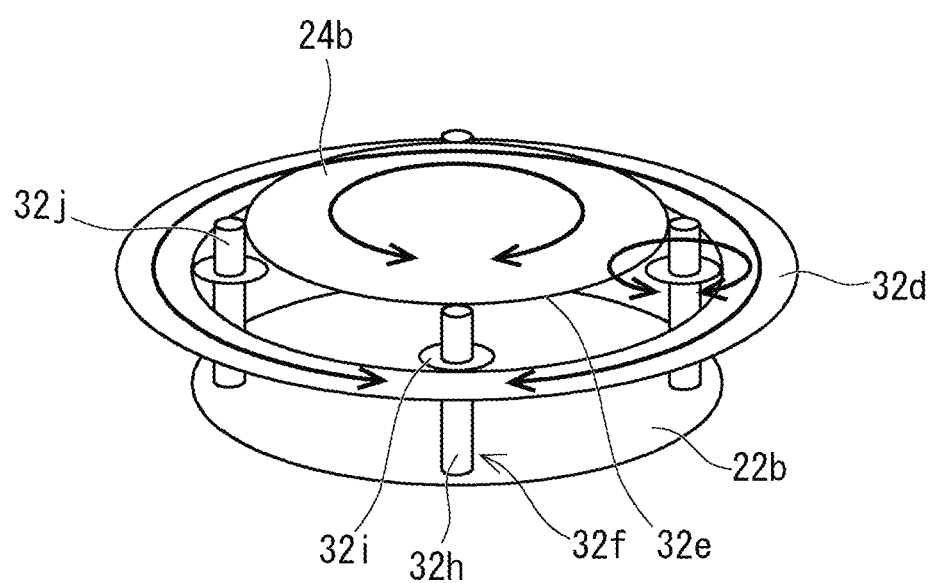
FIG. 14 is a perspective view for describing a drive transmission part of a second drive part in the extension/contraction mechanism according to the first embodiment.
Figure 15:
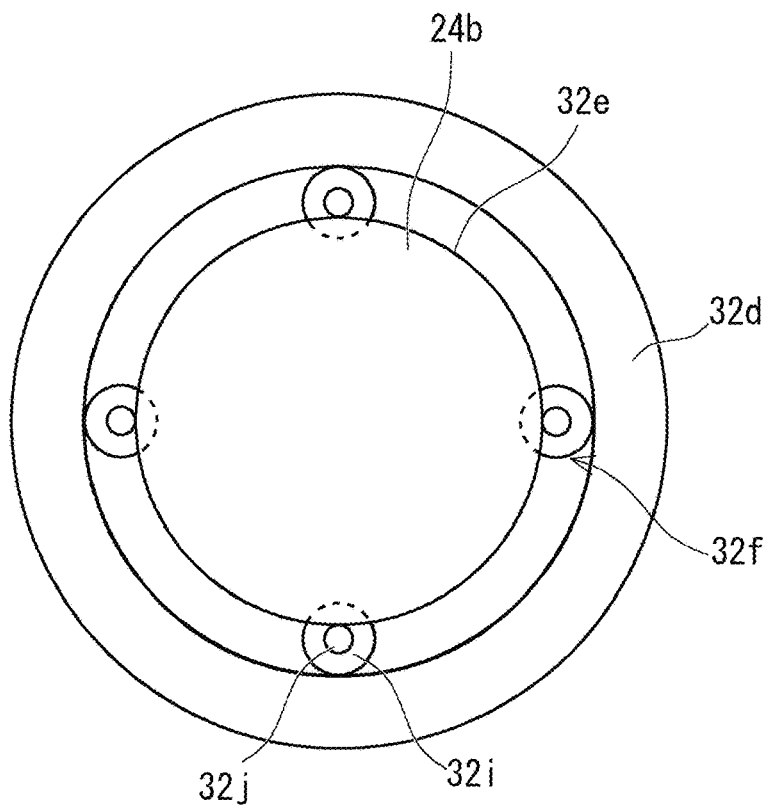
FIG. 15 is a plan view for describing the drive transmission part of the second drive part in the extension/contraction mechanism according to the first embodiment.
Figure 16:
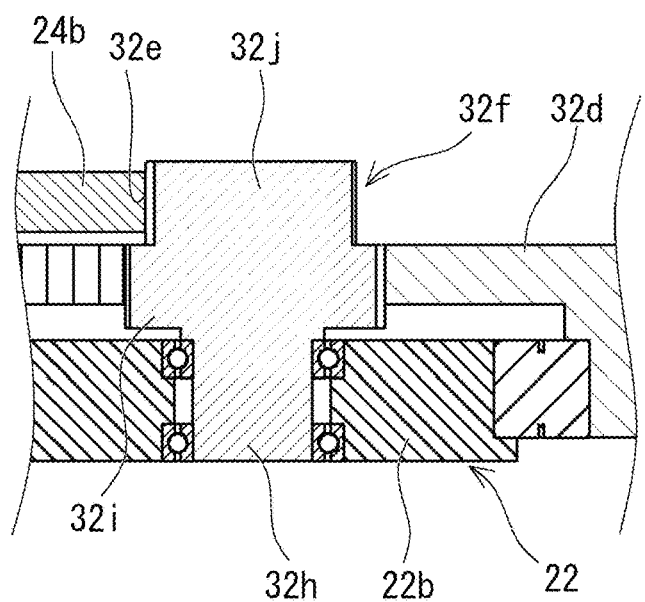
FIG. 16 is a cross-sectional view showing an area near a planet gear of the second drive part in the extension/contraction mechanism according to the first embodiment in an enlarged manner.

FIG. 14 is a perspective view for describing a drive transmission part of the second drive part in the extension/contraction mechanism according to this embodiment. FIG. 15 is a plan view for describing the drive transmission part of the second drive part in the extension/contraction mechanism according to this embodiment. FIG. 16 is a cross-sectional view showing an area near the planet gear of the second drive part in the extension/contraction mechanism according to this embodiment in an enlarged manner.

As shown in FIG. 6, the pinion gear 32c is fixed to the output shaft of the motor 32a. As shown in FIGS. 6 and 16, the ring gear 32d is rotatably supported by the flange part 22b of the main shaft 22 and a tooth part is formed on each of the outer peripheral surface and the inner peripheral surface of the ring gear 32d. The external tooth part 32e is formed on the outer peripheral surface of the flange part 24b of the screw shaft 24.

As FIGS. 14 and 16, the planet gear 32f includes a rotation shaft 32h, a first gear part 32i, and a second gear part 32j. The rotation shaft 32h is extended in the vertical direction, and the lower end part of the rotation shaft 32h is rotatably supported by the flange part 22b of the main shaft 22. As shown in FIGS. 14 to 16, the first gear part 32i, which is a gear provided in the rotation shaft 32h, is engaged with the tooth part formed on the inner peripheral surface of the ring gear 32d.

As shown in FIGS. 14 and 16, the second gear part 32j, which is a gear provided in the rotation shaft 32h, is engaged with the external tooth part 32e formed in the flange part 24b of the screw shaft 24. In this case, while the second gear part 32j is arranged above the first gear part 32i in FIGS. 14 and 16, the second gear part 32j may be arranged below the first gear part 32i.

In the first drive part 31 and the second drive part 32 described above, when the rotational speed transmitted to the screw shaft 24 to rotate the screw shaft 24 by the first drive part 31 is equal to the rotational speed transmitted to the screw shaft 24 to rotate the screw shaft 24 by the second drive part 32, the extension/contraction part 4 turns via the main shaft 22, and when the above rotational speeds are different from each other, the extension/contraction part 4 is extended or contracted.

In other words, when the rotational speed of the screw shaft 24 for rotating the screw shaft 24 by the first drive part 31 is equal to the rotational speed of the screw shaft 24 for rotating the screw shaft 24 by the second drive part 32, the extension/contraction part 4 turns via the main shaft 22, and when the above rotational speeds are different from each other, the extension/contraction part 4 is extended or contracted. The "rotational speed" is indicated by "+" and "−", in which "+" indicates the rotation of the screw shaft 24 in one direction and "−" indicates the rotation of the screw shaft 24 in the other direction when the mobile body 1 is seen from above.

In this case, the first drive part 31 and the second drive part 32 may satisfy, for example, the following condition. Since the extending/contracting motion of the extension/contraction part 4 is the difference between the amount of rotation of the main shaft 22 and that of the screw shaft 24, it can be expressed by the following <Expression 1>.

$$v_p = p(\omega_s - \omega_m) \quad \text{[Expression 1]}$$

The symbol $v_p$ denotes the extension/contraction speed of the extension/contraction part 4, p denotes a pitch length of the groove parts 24c of the screw shaft 24, $\omega_s$ denotes the rotational speed of the screw shaft 24, and $\omega_m$ denotes the rotational speed of the main shaft 22.

At this time, since the rotational speed $\omega_p$ of the frame 21 with respect to the main shaft 22 matches the rotational speed of the main shaft 22, it can be expressed by the following <Expression 2>.

$$\omega_p = \omega_m \quad \text{[Expression 2]}$$

From the relation of the planet gear 32f, the following <Expression 3> is satisfied.

$$\begin{cases} \omega_s = \omega_m - \dfrac{Z_1}{Z_s}\omega_y \\ \omega_i = \omega_m - \dfrac{Z_2}{Z_i}\omega_y \end{cases} \quad \text{[Expression 3]}$$

The symbol $Z_1$ denotes the number of teeth of the second gear part 32j of the planet gear 32f, $Z_s$ denotes the number of teeth of the external tooth part 32e formed in the flange part 24b of the screw shaft 24, $\omega_y$ denotes the rotating speed of the planet gear 32f, $\omega_i$ denotes the rotational speed of the ring gear 32d, $Z_2$ denotes the number of teeth of the first gear part 32i of the planet gear 32f, and $Z_i$ denotes the number of teeth of the tooth part formed on the inner peripheral surface of the ring gear 32d.

In this case, it is assumed that <Expression 4> is satisfied.

$$\dfrac{Z_1}{Z_s} = \dfrac{Z_2}{Z_i} \quad \text{[Expression 4]}$$

From the above discussion, <Expression 5> can be derived by deleting $\omega_y$.

$$\begin{cases} v_p = \dfrac{p}{2}(\omega_s - \omega_i) \\ \omega_p = \dfrac{1}{2}(\omega_s + \omega_i) \end{cases} \quad \text{[Expression 5]}$$

Therefore, when <Expression 6> is satisfied, <Expression 7> can be derived.

$$J = \dfrac{1}{2}\begin{pmatrix} p & -p \\ 1 & 1 \end{pmatrix} \quad \text{[Expression 6]}$$

$$\begin{pmatrix} v_p \\ \omega_p \end{pmatrix} = J \begin{pmatrix} \omega_s \\ \omega_i \end{pmatrix} \quad \text{[Expression 7]}$$

By using an inverse matrix, <Expression 8> may be satisfied.

$$\begin{pmatrix} \omega_s \\ \omega_i \end{pmatrix} = J^{-1}\begin{pmatrix} v_p \\ \omega_p \end{pmatrix} = \frac{1}{p}\begin{pmatrix} 1 & p \\ -1 & p \end{pmatrix}\begin{pmatrix} v_p \\ \omega_p \end{pmatrix} \quad \text{[Expression 8]}$$

Further, from a static relationship, <Expression 9> may be satisfied.

$$\begin{pmatrix} \tau_s \\ \tau_i \end{pmatrix} = J^T\begin{pmatrix} F_p \\ T_p \end{pmatrix} = \frac{1}{2}\begin{pmatrix} p & 1 \\ -p & 1 \end{pmatrix}\begin{pmatrix} F_p \\ T_p \end{pmatrix} \quad \text{[Expression 9]}$$

The symbol $\tau_s$ denotes torque input to the screw shaft 24, $\tau_i$ denotes torque input to the ring gear 32d, $F_p$ denotes an extension/contraction force of the extension/contraction part 4, and $T_p$ denotes output torque of the frame 21 with respect to the main shaft 22.

When the extension/contraction part 4 performs only the extending/contracting motion, if the following conditions <Expression 10> and <Expression 11> are satisfied, then <Expression 12> and <Expression 13> may be satisfied.

$$\begin{pmatrix} F_p \\ T_p \end{pmatrix} = \begin{pmatrix} 1 \\ 0 \end{pmatrix} \quad \text{[Expression 10]}$$

$$\begin{pmatrix} v_p \\ \omega_p \end{pmatrix} = \begin{pmatrix} 1 \\ 0 \end{pmatrix} \quad \text{[Expression 11]}$$

$$\begin{pmatrix} \tau_s \\ \tau_i \end{pmatrix} = \frac{1}{2}\begin{pmatrix} p \\ -p \end{pmatrix} \quad \text{[Expression 12]}$$

$$\begin{pmatrix} \omega_s \\ \omega_i \end{pmatrix} = \frac{1}{p}\begin{pmatrix} 1 \\ -1 \end{pmatrix} \quad \text{[Expression 13]}$$

On the other hand, when the extension/contraction part 4 performs only the turning motion, if the following conditions <Expression 14> and <Expression 15> are satisfied, then <Expression 16> and <Expression 17> may be satisfied.

$$\begin{pmatrix} F_p \\ T_p \end{pmatrix} = \begin{pmatrix} 0 \\ 1 \end{pmatrix} \quad \text{[Expression 14]}$$

$$\begin{pmatrix} v_p \\ \omega_p \end{pmatrix} = \begin{pmatrix} 0 \\ 1 \end{pmatrix} \quad \text{[Expression 15]}$$

$$\begin{pmatrix} \tau_s \\ \tau_i \end{pmatrix} = \frac{1}{2}\begin{pmatrix} 1 \\ 1 \end{pmatrix} \quad \text{[Expression 16]}$$

$$\begin{pmatrix} \omega_s \\ \omega_i \end{pmatrix} = \frac{1}{p}\begin{pmatrix} p \\ p \end{pmatrix} \quad \text{[Expression 17]}$$

Therefore, in both the extending/contracting motion and the turning motion of the extension/contraction part 4, the output of the motor 31a of the first drive part 31 and the output of the motor 32a of the second drive part 32 can be combined with each other.

Since <Expression 4>, which is assumed above, is to obtain the above relation when equivalent outputs can be obtained from the motor 31a of the first drive part 31 and the motor 32a of the second drive part 32, if, for example, the output of the motor 31a of the first drive part 31 is different from the output of the motor 32a of the second drive part 32, <Expression 4> may not necessarily be satisfied.

Next, operations when the extension/contraction part 4 of the extension/contraction mechanism 2 according to this embodiment is extended or contracted will be described. The motor 31a of the first drive part 31 and the motor 32a of the second drive part 32 are rotationally driven in such a way that the rotational speed transmitted to the screw shaft 24 to rotate the screw shaft 24 by the first drive part 31 becomes different from the rotational speed transmitted to the screw shaft 24 to rotate the screw shaft 24 by the second drive part 32, the rotational drive force of the motor 31a is transmitted to the screw shaft 24 via the drive transmission part 31b of the first drive part 31 and the belt guide 25, and the rotational drive force of the motor 32a is transmitted to the main shaft 22 and the screw shaft 24 via the drive transmission part 32b of the second drive part 32.

Accordingly, the screw shaft 24 is differentially rotated with respect to the main shaft 22, and this rotation of the screw shaft 24 causes the extension/contraction part 4 to be extended while the first belt 11 and the second belt 12 are drawn and wound in a spiral shape or causes the extension/contraction part 4 to be contracted while the state in which the first belt 11 and the second belt 12 are engaged with each other and wound is loosened.

At this time, in the mobile body 1 and the extension/contraction mechanism 2 according to this embodiment, the lower part of the extension/contraction part 4 is held by the rollers 29a of the first roller unit 29 and the rollers 30a of the second roller unit 30 in the thickness direction of the extension/contraction part 4, whereby it is possible to prevent a swing of the extension/contraction part 4.

Next, operations when the extension/contraction part 4 of the extension/contraction mechanism 2 according to this embodiment turns will be described. The motor 31a of the first drive part 31 and the motor 32a of the second drive part 32 are rotationally driven in such a way that the rotational speed transmitted to the screw shaft 24 to rotate the screw shaft 24 by the first drive part 31 becomes equal to the rotational speed transmitted to the screw shaft 24 to rotate the screw shaft 24 by the second drive part 32, thereby transmitting the rotational drive force of the motor 31a to the screw shaft 24 via the drive transmission part 31b of the first drive part 31 and the belt guide 25 and transmitting the rotational drive force of the motor 32a to the main shaft 22 and the screw shaft 24 via the drive transmission part 32b of the second drive part 32.

Accordingly, the main shaft 22 and the screw shaft 24 are equally rotated, the main shaft 22, the screw shaft 24, the belt guide 25, and the extension/contraction part 4 are integrally rotated, as a result of which the extension/contraction part 4 turns with respect to the base part 5.

Further, the mobile body 1 or the extension/contraction mechanism 2 according to this embodiment is able to achieve the extending/contracting motion and the turning motion of the extension/contraction part 4 by the first drive part 31 and the second drive part 32. In addition, the output of the motor 31a of the first drive part 31 and the output of the motor 32a of the second drive part 32 are combined with each other, whereby it is possible to achieve the extending/contracting motion and the turning motion of the extension/contraction part 4. Therefore, the size of the motors 31a and 32a can be reduced compared to that in the case in which the extending/contracting motion and the turning motion of the extension/contraction part 4 are achieved separately by outputs of respective motors using two motors, which contributes to reducing the size and the weight of the mobile body 1.

Second Embodiment

Figure 17:
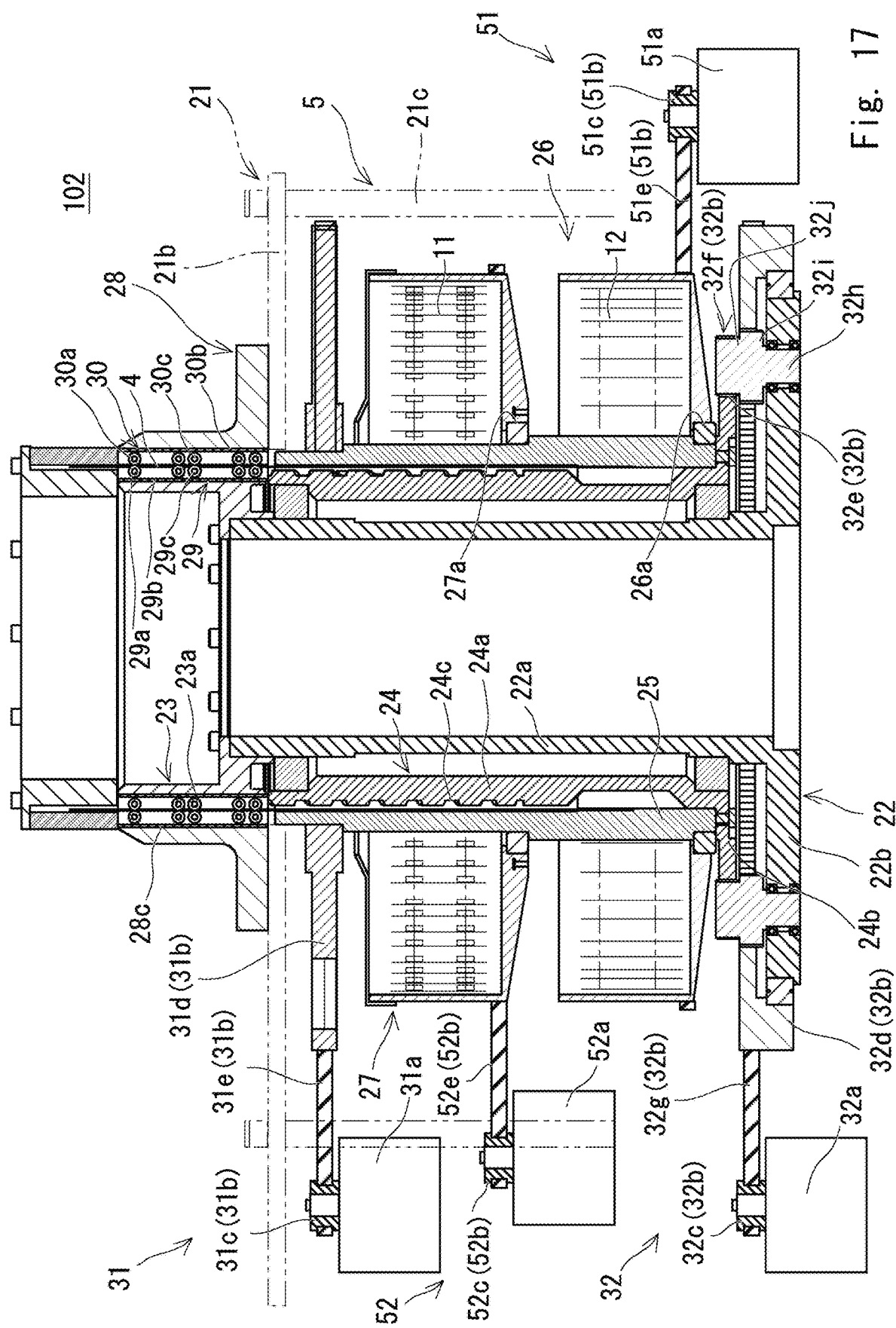
FIG. 17 is a horizontal cross-sectional view showing the extension/contraction mechanism according to the second embodiment.

A mobile body according to this embodiment will be described. The mobile body according to this embodiment has the same configuration as the mobile body according to the first embodiment except for the extension/contraction mechanism. FIG. 17 is a horizontal cross-sectional view showing the extension/contraction mechanism according to this embodiment.

As shown in FIG. 17, an extension/contraction mechanism 102 has the same configuration as the extension/contraction mechanism 2 except that the base part 5 further includes a first belt holder drive part 51 and a second belt holder drive part 52.

The first belt holder drive part 51 includes a motor 51a and a drive transmission part 51b. The motor 51a is supported by the first plate 21a of the frame 21, although the motor 51a is not specifically shown in FIG. 17. The drive transmission part 51b is equipped with a pinion gear 51c and a belt 51e.

The pinion gear 51c is fixed to the output shaft of the motor 51a. The first belt holder 26 is equipped with a ring gear having a tooth part formed on the outer peripheral surface thereof. The belt 51e, which is an endless belt having a tooth part formed on the inner peripheral surface thereof. The belt 51e is bridges the pinion gear 51c and the first belt holder 26.

The second belt holder drive part 52 includes a motor 52a and a drive transmission part 52b. The motor 52a is supported by second plate 21b of the frame 21, although the motor 52a is not specifically shown in FIG. 17. The drive transmission part 52b includes a pinion gear 52c and a belt 52e.

The pinion gear 52c is fixed to the output shaft of the motor 52a. The second belt holder 27 is equipped with a ring gear with teeth formed on the outer peripheral surface of the second belt holder 27. The belt 52e is an endless belt in which a tooth part is formed on the inner peripheral surface thereof. The belt 52e bridges over the pinion gear 52c and the second belt holder 27.

The first belt holder drive part 51 rotates the first belt holder 26 independently of the rotation of the screw shaft 24. Similarly, the second belt holder drive part 52 rotates the second belt holder 27 independently of the rotation of the screw shaft 24. Accordingly, while the extension/contraction part 4 is being expanded and contracted, the first belt holder 26 and the second belt holder 27 are rotated independently about the screw shaft 24. Thus, for example, the difference between the belt feed rate of the second belt 12 fed from the first belt holder 26 and the belt wound-up rate of the second belt 12 wound-up by the screw shaft 24 while the extension/contraction part 4 is being extended can be suppressed. Accordingly, it is possible to lessen increase in stress imposed on the second belt 12. For the same reason, it is possible to lessen increase in stress imposed on the first belt 11.

The first belt holder drive part 51 may rotate the first belt holder 26 at a rotational speed, which is lower than the rotational speed of the screw shaft 24. The second belt holder drive part 52 may rotate the second belt holder 27 at a rotational speed lower than the rotational speed of the screw shaft 24. For instance, while the extension/contraction part 4 is being extended, the minimum diameter Rb (see FIG. 18), which is the diameter of the innermost inner circumferential part of the second belt 12 accommodated in the first belt holder 26, is apt to increase and the belt feed rate of the second belt 12 fed from the first belt holder 26 is apt to increase accordingly. When the first belt holder 26 rotates at a rotational speed lower than the rotational speed of the screw shaft 24, the belt feed rate of the second belt 12 fed from the first belt holder 26 can be reduced so as to be less than the belt wound-up rate of the second belt 12 wound up by the screw shaft 24. As a result, the aforementioned differences can be suppressed. Therefore, it is possible to lessen increase in stress imposed on the second belt 12. For the same reason, it is possible to lessen increase in stress imposed on the first belt 11.

Also, as the extension/contraction part 4 is extended, the ratio k of the rotational speed of the first belt holder 26 to the rotational speed of the screw shaft 24 and the ratio k of the rotational speed of the second belt holder 27 to the rotational speed of the screw shaft 24 may decrease.

The ratio k of the rotational speed of the first belt holder 26 to the rotational speed of the screw shaft 24 may be calculated by the following <Expression 18> and <Expression 19>. Similarly, the ratio k of the rotational speed of the second belt holder 27 to the rotational speed of the screw shaft 24 may be calculated by the following <Expression 18> and <Expression 19>.

Figure 18:
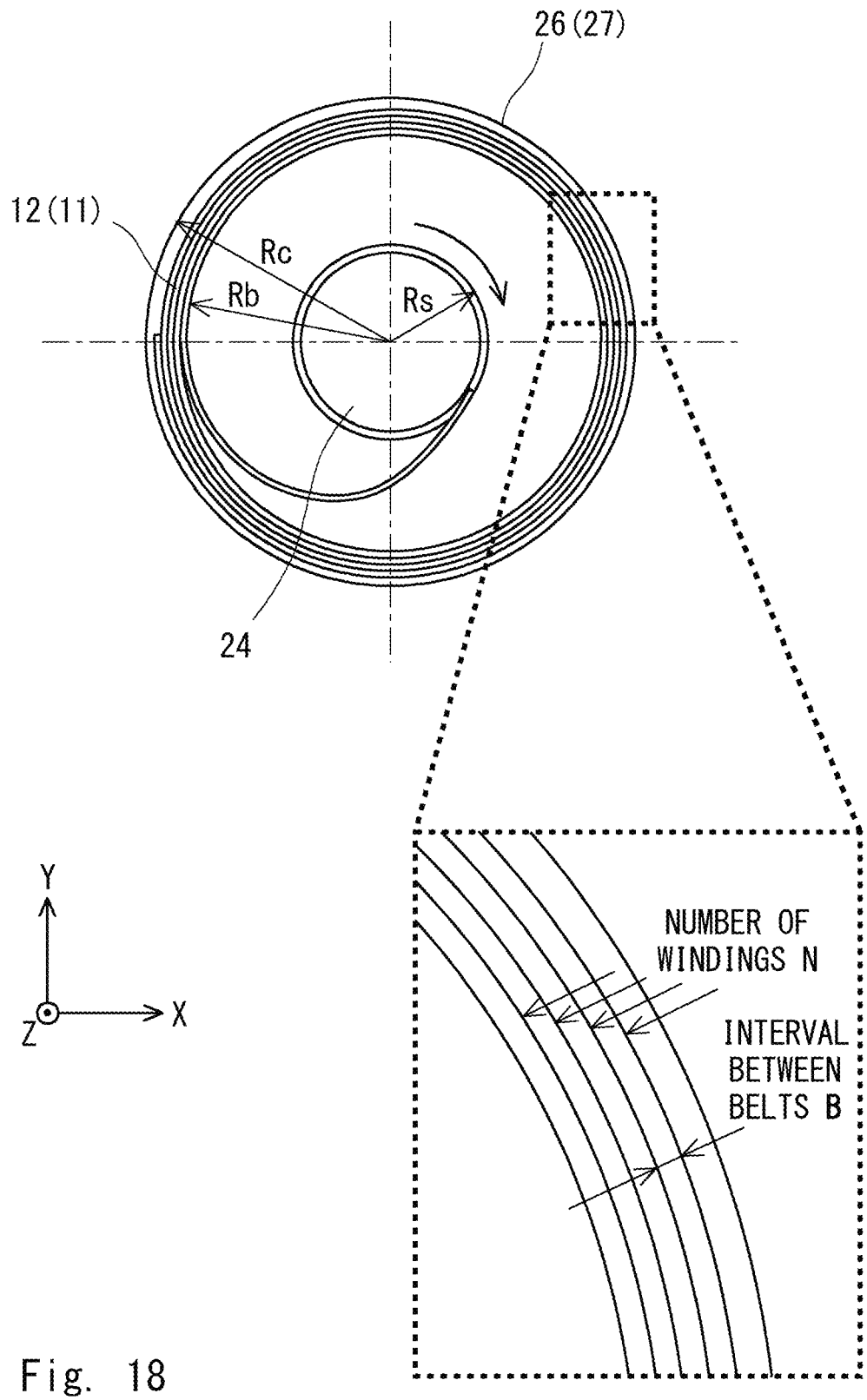
FIG. 18 is a schematic view showing the interior of a first belt holder 26 and an enlarged schematic view thereof.

The following <Expression 18> expresses the relationship between the ratio k of the rotational speed of the first belt holder 26 to the rotational speed of the screw shaft 24, the height H of the extension/contraction part 4, the diameter Rs of the second belt 12 wound around the screw shaft 24, and the minimum diameter Rb of the second belt 12 accommodated in the first belt holder 26. The height H of the extension/contraction part 4 is the same as the extended length of the extension/contraction part 4 in the extending direction thereof. FIG. 18 shows the diameter Rs of the second belt 12 wound around the screw shaft 24 and the minimum diameter Rb of the second belt 12 accommodated in the first belt holder 26. The reference numbers in parentheses in FIG. 18 denote the corresponding configurations of the first belt holder 26. In the following <Expression 18>, the aforementioned ratio k of the rotational speeds and the aforementioned minimum diameter Rb are functions of the height H of the extension/contraction part 4.

$$k(H) = 1 - Rs/Rb(H) \qquad \text{[Expression 18]}$$

The following <Expression 19> expresses the relationship among the minimum diameter Rb of the second belt 12 accommodated in the first belt holder 26, the inner diameter Rc of the first belt holder 26, the interval B in the radial direction of the second belt 12 wound-up and accommodated in the first belt holder 26, the length Lo of the second belt 12 accommodated in the first belt holder 26 when the extension/contraction part 4 contracts to its utmost, the accommodated amount Sa of the second belt 12 in the first belt holder 26, the height H of the extension/contraction part 4, and the amount of extension/contraction P of the extension/contraction part 4 per rotation of the screw shaft 24.

$$Rb(H) = Rc - B \frac{-(\pi B - Rc) + \sqrt{(\pi B - Rc)^2 - 4\pi B\left(Lo - Sa\left(\frac{H}{P}\right)\right)}}{2\pi B} \qquad \text{[Expression 19]}$$

<Calculation Method 1>

Next, the method for calculating the aforementioned <Expression 18> will be described.

The rotational speed in the first belt holder 26 may be set to meet the following <Expression 20> and <Expression 21>. By making such a setting, stress imposed on the second belt 12 is lessened.

The following <Expression 20> expresses the relationship between the belt wound-up rate Ss of the second belt 12 wound-up by the screw shaft 24 and the belt feed rate Ca of the second belt 12 fed from the first belt holder 26, while the extension/contraction part 4 is being extended.

$$Ss = Ca \quad \text{[Expression 20]}$$

The following <Expression 21> expresses the relationship between the belt unwinding rate Cs of the second belt 12 from the screw shaft 24 and the belt accommodation rate Sa of the second belt 12 accommodated in the first belt holder 26, while the extension/contraction part 4 is being contracted.

$$Cs = Sa \quad \text{[Expression 21]}$$

The belt wound-up rate Ss and the belt accommodation rate Sa mentioned above may always be constant and correspond to the diameter Rs of the second belt 12 wound around the screw shaft 24. The following <Expression 22> expresses the relationship among the aforementioned belt wound-up rate Ss, the belt accommodation rate Sa, and the number of rotations Vs of the screw shaft 24.

$$Sa = Ss = 2\pi R s V s \quad \text{[Expression 22]}$$

The belt feed rate Ca and the belt unwinding rate Cs mentioned above depend on the minimum diameter Rb of the second belt 12 accommodated in the first belt holder 26. The following <Expression 23> expresses the relationship among the belt feed rate Ca, the belt unwinding rate Cs, the minimum diameter Rb, the number of rotations Vb of the first belt holder 26 or the second belt holder 27, and the number of rotations Vs of the screw shaft 24.

$$Ca = Cs = 2\pi Rb(Vs - Vb) \quad \text{[Expression 23]}$$

The belt feed rate Ca, which is a feed rate f the second belt 12 fed from the first belt holder 26, and the belt unwinding rate Cs, which is a wound-up rate of the second belt 12 from the screw shaft 24, vary according to the amount of the second belt 12 within the first belt holder 26 and depend on the height H of the extension/contraction part 4. The following <Expression 24> expresses the ratio k of the rotational speed of the first belt holder 26 to the rotational speed of the screw shaft 24 as a function of the height H of the extension/contraction part 4. In the following <Expression 24>, the extension/contraction part 4 can be extended or contracted without making the belt feed rate Ca and the belt unwinding rate Cs of the second belt 12 excessive or deficient by appropriately changing the ratio k according to the height H of the extension/contraction part 4.

$$k(H) = \frac{Vb}{Vs} = 1 - Rs/Rb \quad \text{[Expression 24]}$$

Using the aforementioned <Expression 20> to <Expression 24>, the aforementioned <Expression 18> can be obtained.

<Calculation Method 2>

Next, the method for calculating the aforementioned <Expression 19> will be described.

As shown in FIG. 18, the minimum diameter Rb of the second belt 12 accommodated in the first belt holder 26 depends on the inner diameter Rc of the first belt holder 26, the number of windings N of the second belt 12 accommodated and wound in the first belt holder 26, and the intervals B in the radial direction of the second belt 12 accommodated and wound in the first belt holder 26. The following <Expression 25> expresses the relationship among the minimum diameter Rb, the inner diameter Rc, the number of windings N, and the intervals B mentioned above.

$$Rb = Rc - NB \quad \text{[Expression 25]}$$

The length L of the second belt 12 accommodated in the first belt holder 26 depends on the length Lo of the second belt 12 accommodated in the first belt holder 26 when the extension/contraction part 4 contracts to its utmost, the belt accommodation rate Sa of the second belt 12 accommodated in the first belt holder 26, the height H of the extension/contraction part 4, and the amount of extension/contraction P of the extension/contraction part 4 per rotation of the screw shaft 24. The following <Expression 26> expresses the relationship among the length L, the length Lo, the belt feed rate Sa, the height H of the extension/contraction part 4, and the amount of extension/contraction P of the second belt 12 accommodated in the aforementioned first belt holder 26.

$$L = Lo - Sa\left(\frac{H}{P}\right) \quad \text{[Expression 26]}$$

The length L of the second belt 12 accommodated in the first belt holder 26 can be determined using the number of windings N of the second belt 12 accommodated and wound in the first belt holder 26 and the minimum diameter Rb of the second belt 12 accommodated in the first belt holder 26. For example, the following <Expression 27> expresses the relationship among the lengths L, number of windings N, minimum diameter Rb, intervals B, and inner diameter Rc described above.

$$L = \sum_0^N 2\pi Rb = \pi BN^2 + (\pi B - Rc)N + L = 0 \quad \text{[Expression 27]}$$

The aforementioned <Expression 27> is a quadratic equation for the number of windings N. Solving this quadratic equation yields the following <Expression 28>. The number of windings N can be expressed using the following <Expression 28>.

$$N = \frac{-(\pi B - Rc) + \sqrt{(\pi B - Rc)^2 - 4\pi BL}}{2\pi B} \quad \text{[Expression 28]}$$

By substituting <Expression 26> for the aforementioned <Expression 28>, the following <Expression 29> can be obtained.

$$N = \frac{-(\pi B - Rc) + \sqrt{(\pi B - Rc)^2 - 4\pi B\left(Lo - Sa\left(\frac{H}{P}\right)\right)}}{2\pi B} \quad \text{[Expression 29]}$$

Based on the above, the aforementioned <Expression 25> and <Expression 29> can be used to obtain the aforementioned <Expression 19>.

Figure 19:
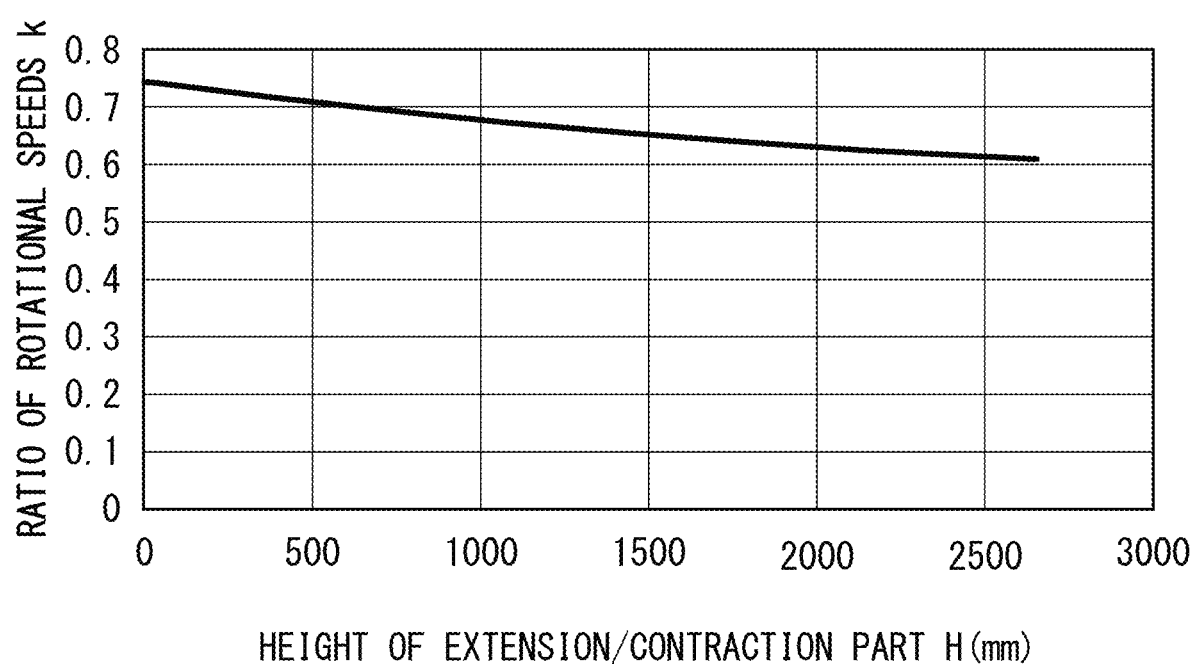
FIG. 19 is a graph showing an example of the ratio of speed to height of an extension/contraction part.

Next, an Example of the result of determining the ratio k of the rotational speeds to the height H of an extension/contraction part according to an embodiment in which the extension/contraction mechanism 102 shown in FIG. 17 is applied will be described with reference to FIG. 19.

In the Example in which the extension/contraction mechanism 102 shown in FIG. 17 is applied, the ratio k of the rotational speeds to the height H0-2500 mm of the extension/contraction part was calculated by using the aforementioned <Expression 18> and <Expression 19> under the given conditions. The result of this calculation is shown in FIG. 19. As the height H of the extension/contraction part decreases, so does the ratio k of the rotational speeds, as shown in FIG. 19.

The present disclosure is not limited to the above-described embodiments and may be changed as appropriate without departing from the gist of the present disclosure. The present disclosure may be implemented by combining the above-described embodiments and the examples thereof as appropriate.

For example, the extension/contraction mechanisms of the first and second embodiments described above are configured so that the extension/contraction part 4 can be turned, but they may be configured so that they cannot be turned.

For example, while the extension/contraction mechanism 2 according to the aforementioned first and second embodiments includes the first roller unit 29 and the second roller unit 30, the first roller unit 29 and the second roller unit 30 may be omitted.

For example, the motor 31*a*, the motor 32*a*, the motor 51*a*, and the motor 52*a* shown in FIG. 17 may be configured to receive control signals from a control apparatus (not shown) and generate different driving forces and transmit these driving forces.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An extension/contraction mechanism comprising a telescopic extension/contraction part, wherein
   the extension/contraction mechanism comprises:
   a first drive source connected to a screw shaft in such a way that it can transmit a drive force;
   a first belt holder that accommodates a second belt in such a way that the second belt can be sent out to the screw shaft or the second belt can be wound-up from the screw shaft;
   a second belt holder that accommodates a first belt in such a way that the first belt can be sent out to the screw shaft or the first belt can be wound-up from the screw shaft; and
   a first belt holder drive part and a second belt holder drive part, and
   wherein
   the extension/contraction part is configured to be extended when the screw shaft rotates in one direction and sends out the first belt and the second belt so that the first belt and the second belt are spirally wound in a state in which they are engaged with each other, and is configured to be contracted when the screw shaft rotates in the other direction and draws in the first belt and the second belt so that the state in which the first belt and the second belt are engaged with each other and spirally wound, is loosened,
   the first belt holder drive part configured to rotate the first belt holder independently of the rotation of the screw shaft, and
   the second belt holder drive part configured to rotate the second belt holder independently of the rotation of the screw shaft.

2. The extension mechanism according to claim 1, wherein
   the first belt holder drive part configured to rotate the first belt holder at a rotational speed lower than a rotational speed of the screw shaft, and
   the second belt holder drive part configured to rotate the second belt holder at a rotational speed lower than the rotational speed of the screw shaft.

3. The extension mechanism according to claim 1, wherein
   as the extension/contraction part is extended, a ratio of the rotational speed of the first belt holder to the rotational speed of the screw shaft and a ratio of the rotational speed of the second belt holder to the rotational speed of the screw shaft decrease.

* * * * *